United States Patent
Janus et al.

(10) Patent No.: US 6,829,198 B1
(45) Date of Patent: Dec. 7, 2004

(54) ELECTROACOUSTIC TRANSDUCER HAVING COMPRESSION SCREW MECHANICAL BIAS

(75) Inventors: Robert S. Janus, Middletown, RI (US); Michael D. Jevnager, Rindge, NH (US); Raymond P. Pineault, Norwich, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/416,113

(22) Filed: Oct. 4, 1999

(51) Int. Cl.[7] ............................................. H04R 17/00
(52) U.S. Cl. ..................................................... 367/163
(58) Field of Search ................................. 367/163, 165, 367/173, 174; 310/324, 325, 326

(56) References Cited

U.S. PATENT DOCUMENTS 2,930,912 A * 3/1960 Miller ......................... 367/157
5,566,132 A * 10/1996 Janus et al. .................. 367/163

* cited by examiner

Primary Examiner—Daniel T. Pihulic
(74) Attorney, Agent, or Firm—James M. Kasischke; Jean-Paul Nasser; Michael F. Oglo

(57) ABSTRACT

An electro acoustic transducer has a housing having an axial threaded bore. A transducer driver element is axially aligned in the bore and has a first end mounted on an electrically conductive holder that is axially displaceable by a conductive screw member. A hemisphere on the other end of the driver element contacts a diaphragm for radiating acoustic signals. An electrical connector has a conductive coil spring coupled to the screw member and is electrically connected to the first end of the driver element via the coil spring, screw member, holder, and mounting plug. Another electrical connector is connected to the other end of the driver element via a conductive front plate, diaphragm, and hemisphere in one embodiment or a flexible lead in another embodiment. In both embodiments, the electrical connectors couple electrical driving signals to the driver elements to cause the driver elements to mechanically vibrate.

16 Claims, 4 Drawing Sheets

ELECTROACOUSTIC TRANSDUCER HAVING COMPRESSION SCREW MECHANICAL BIAS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to underwater transducers. More particularly, this invention relates to a transducer having an in-line screw exerting compressive force to prevent generation of excessive tensile stress.

(2) Description of the Prior Art

Acoustic signals are commonly used for underwater navigation, communications, and imaging. The devices that generate underwater sound for these applications convert input energy into mechanical vibrations. These vibrations are then radiated into the surrounding medium. This conversion of energy from one form to another is termed transduction, and the devices that make this conversion are called transducers.

Many of the transducers now in use contain electromechanical ceramic materials. These ceramics deform when electric or magnetic fields are applied to them. The deformations produce the mechanical vibrations that are radiated by the transducers as underwater sound. However, if excessive tensile stresses are allowed to develop in the ceramics as they deform, the ceramics will fracture, and the transducers will cease to operate property, or may fail completely. To prevent this problem a permanent compressive stress must be applied to the ceramics.

Prior art designs have created compressive bias stress using stress rods. One such example of the prior art is shown in U.S. Pat. No. 2,930,912 to H. B. Miller. Miller uses multiple stress rods alongside his stack of ferroelectric elements; however, this increases the complexity of the design, and stress rods become particularly difficult to implement with small drivers. Miller also uses a central stress rod to exert compressive force. Typically, an axial hole extends throughout the entire length of the ceramic driver to accommodate the stress rod. Since the hole occupies a volume that could otherwise be filled by additional driver material, performance of the transducer may be decreased by this design. Furthermore, machining such holes in small drivers having, for example, outer diameters of about 2 mm is difficult to accomplish. In FIG. 6 Miller shows a pair of annular retainer members that engage the threaded housing to compress the ferroelectric stack. However, it appears that Miller compresses his ferroelectric stack between essentially identical threaded retainer caps and does not compress his ferroelectric stack between a radiating diaphragm and an adjustable screw within a housing. Furthermore, during tightening of the end members, torsional loading might be transmitted to the stack and damage it.

Thus, in accordance with this inventive concept, a need has been recognized in the state of the art for an electroacoustic transducer having a driver element electrically coupled to conductive components and a coil spring disposed in-line with a radiating diaphragm and a threaded member that hold the driver in compression without transmitting torsional loads.

SUMMARY OF THE INVENTION

Accordingly, it is an object of the invention is to provide an improvement for electroacoustic transducers.

Another object of the invention is to provide an apparatus for compressing the driver element of an electroacoustic transducer that eliminates one or more stress rods otherwise used to maintain compressive bias in conventional transducers.

Another object of the invention is to provide an electroacoustic transducer compressively biasing a driver with an in-line screw member.

Another object of the invention is to provide an electroacoustic transducer having minimum parts to compress a ferroelectric driver and couple electrical signals thereto.

Another object of the invention is to provide an electroacoustic transducer having uncomplicated disassembly and reassembly when replacing a driver element.

Another object of the invention is to provide an electroacoustic transducer having its driver element in a conductive holder engaging channels to prevent creation of torsional stresses in the driver element as a screw member creates compressive stress in the driver element.

Another object of the invention is to provide an electroacoustic transducer having one end of its driver element coupled to a hemisphere which has its apex contacting the center point of an axially aligned diaphragm to distribute loads and reduce the possibility of creating uneven stresses in the driver element that may otherwise fracture it.

Another object of the invention is to provide an acoustic transducer having an end of its driver element coupled to a resilient coil spring to make electrical contact with the driver element via a conductive holder and screw member that exert compressive bias.

Another object of the invention is to provide an acoustic transducer having a diaphragm for radiating acoustic energy that also functions as part of the electrically conductive path for the driver.

These and other objects of the invention will become more readily apparent from the ensuing specification when taken in conjunction with the appended claims.

The present invention provides an electroacoustic transducer that has a driver element coupled to an axially disposed diaphragm. A coil spring conducts electrical power to the driver element through an axially in-line conductive screw member, holder, and mounting plug that exert compressive bias but no torsional loads on the driver element to prevent development of excessive tensile stress during projection of acoustic signals.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENTS

Figure 1:
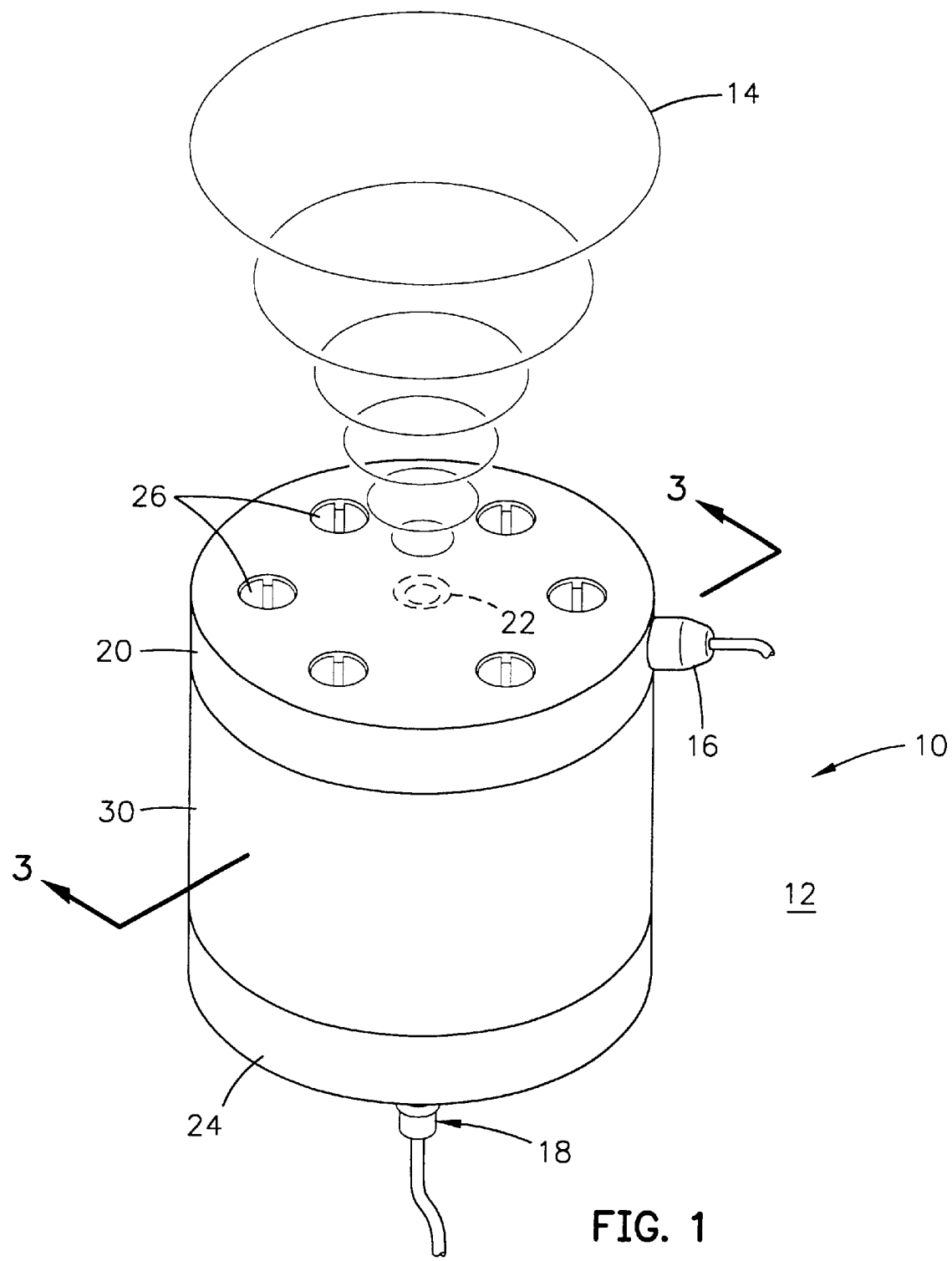
FIG. 1 isometrically depicts the invention projecting acoustic signals through water.

Referring to FIG. 1, electroacoustic transducer 10 is disposed in water 12 to radiate acoustic energy 14. Electroacoustic transducer 10 is driven to project acoustic energy 14 when alternating electrical driving signals from a remote source (not shown) are coupled to it through electrical connectors 16 and 18.

Figure 2:
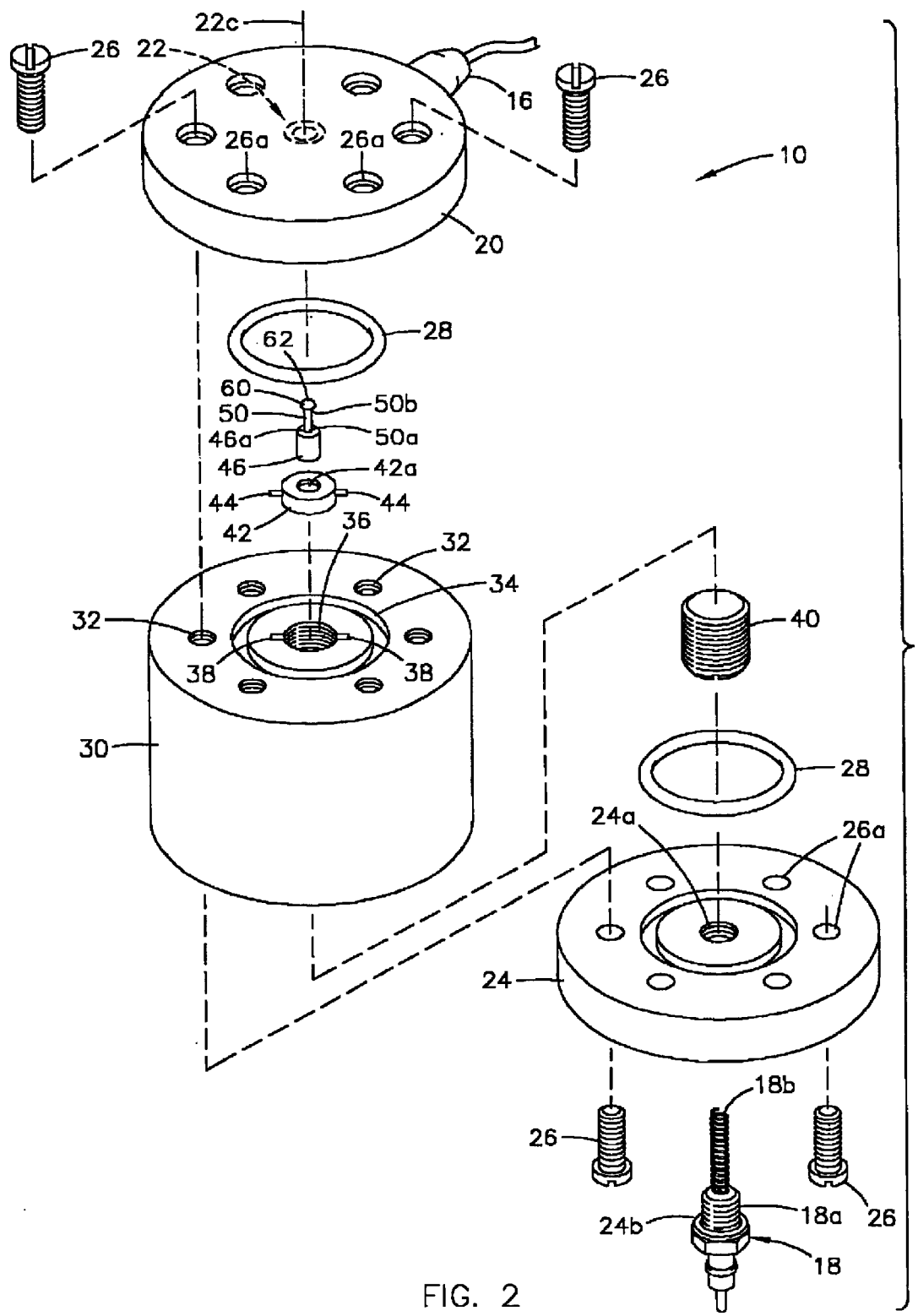
FIG. 2 schematically shows an exploded view of a first embodiment.
Figure 3:
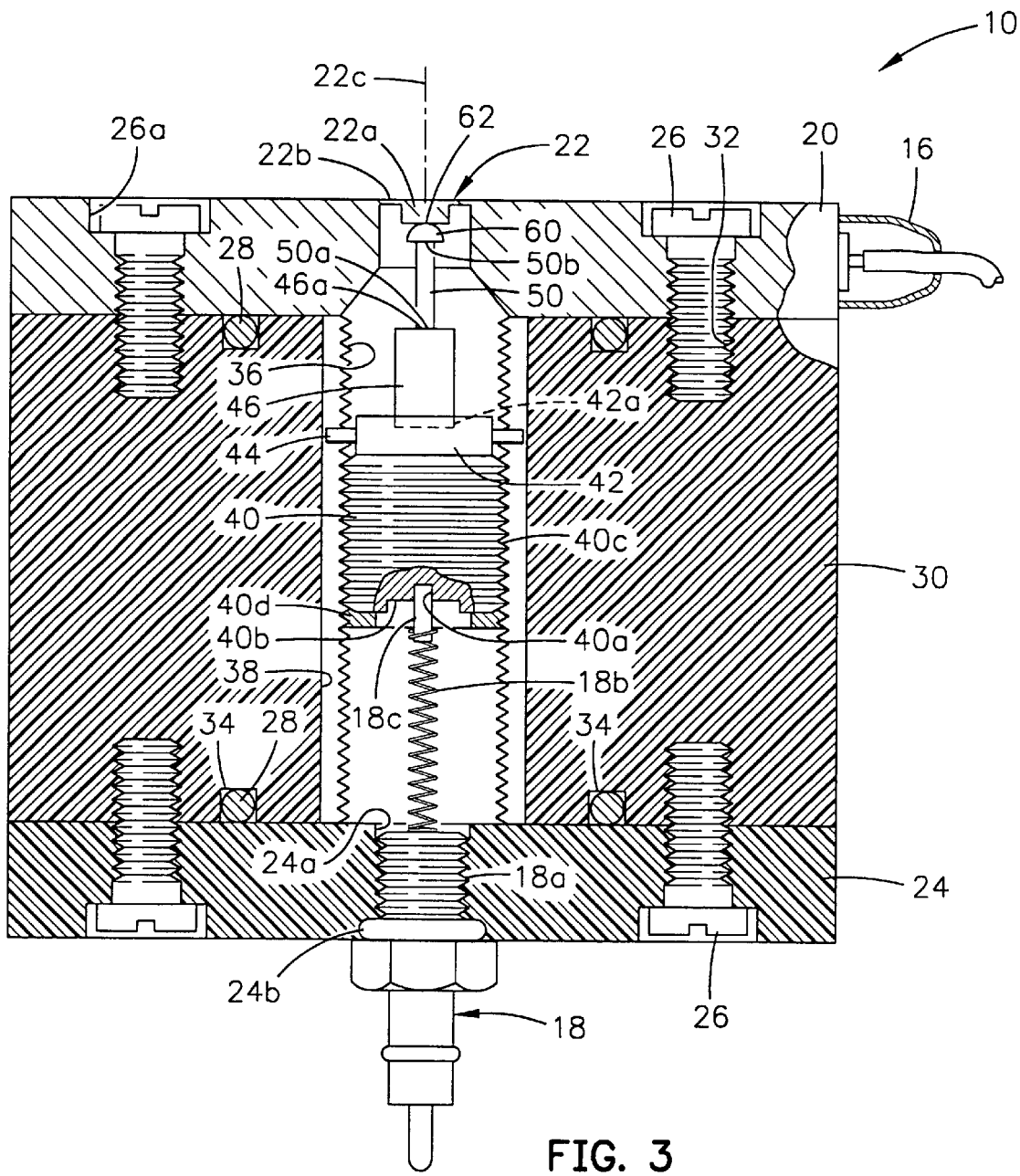
FIG. 3 is a cross-sectional view of the first embodiment taken generally along lines 3—3 in FIG. 1.

Referring also to FIGS. 2 and 3, transducer 10 has front plate 20 and back plate 24 mounted on opposite ends of housing 30. Front plate 20 may be made from electrically conductive material, e.g., brass which is connected to electrical connector 16 and has a portion of it machined away to form diaphragm 22 that is integral with front plate 20. Diaphragm 22 may have diameter of about 0.25 inches and a thickness of 0.031 inches in center portion 22a and an outer diameter of about 0.5 inches with a thickness of about 0.007 inches in radially outwardly annulus portion 22b. Center portion 22a is made thicker to prevent indentation, or dimpling of diaphragm 22 by the load imposed by contact with apex 62 of hemisphere 60, to be described below. Other structures for diaphragm 22 might be provided, such as an appropriately configured layer (or layers) suitably attached to front plate 20.

Back plate 24 may be made from electrically nonconducting, or insulator material, such as the material commercially marketed under the trademark PLEXIGLAS. Back plate 24 has threaded hole 24a and O-ring 24b that sealably retain fitting 18a of electrical connector 18 in housing 30 when fitting 18a of connector 18 is appropriately tightened.

Connector 18 may be brazed, conductively epoxied, or otherwise permanently attached to elongate coil spring, or resilient lead 18b that extends into housing 30.

Compression screw member 40 is machined from an electrically conductive material, such as metal, to have indent 40a, end slot 40b, and threaded surface 40c. Indent 40a receives dowel pin 18c of connector 18. Pin 18c is attached to lead 18b. Indent 40a may be differently shaped and modified to receive and retain pin 18c, and end slot 40b may also be a hex-socket or have some other suitable part configured for engaging a mating tool to rotate and displace screw member 40. Threaded surface 40c is machined to mate with threaded axial bore 36 within housing 30. Thus, screw member 40 can be axially displaced in threaded bore 36 and exert a compressive force when a screwdriver is inserted through threaded hole 24a in back plate 24 to engage slot 40b and is rotated. Retainer ring, or lock washer 40d may be included to hold screw member 40 in place after it is tightened.

Use of the term resilient lead is intended to mean that lead 18b maintains electrical connection between fitting 18a and screw member 40 when fitting 18a is threaded into hole 24a. FIGS. 2 and 3 show lead 18b in the form of a spring coil, allowing lead 18b to compress when fitting 18a is threaded into hole 24a. The attachment between lead 18b, pin 18c and indent 40a may take any number of forms. Pin 18c may be fixed to lead 18b and rotatably inserted into indent 40a. Alternatively, pin 18c may also be rotatably attached to lead 18b, such as by being held within the spring coils of lead 18b, and be removeably fixed within indent 40a.

Front and back plates 20 and 24 are secured to housing 30 by a plurality of screws, or bolts 26 that reach through holes 26a in the plates and are tightened into appropriately disposed threaded holes 32 in housing 30. Separate O-ring 28 is retained between each plate 20 and 24 and housing 30 in separate annular grooves 34 to seal the interior of housing 30 from ambient water when all bolts 26 are tightened.

Housing 30 is made from electrically nonconducting, or insulator material, such as the material marketed under the trademark PLEXIGLAS. Axial bore 36 has a pair of diametrically opposed, longitudinal guide channels 38 machined in housing 30 to extend across housing 30 from a front side where front plate 20 is mounted to a rear side where rear plate 24 is mounted.

Rotation of compression screw 40 also displaces electrically conductive metal holder 42 inside of threaded axial bore 36. Holder 42 is sized to longitudinally travel within bore 36 but does not engage the threads of bore 36. Dowel pins 44 extend from holder 42 into guide channels 38 and are sized to freely slide longitudinally in them. Dowel pins 44 may be the end portion of a single metal shaft extending through holder 42 or may be two short metal pieces secured to holder 42. Either way, dowel pins 44 in guide channels 38 prevent rotation of holder 42 as compression screw 40 rotates to axially displace it in bore 36.

A recess 42a in holder 42 supports mounting plug 46 which is made from an electrically conductive material such as metal. Mounting plug 46 has a uniform flat surface 46a that abuts transducer driver element 50 at one end 50a. Mounting plug 46 and end 50a of driver element 50 are secured together for positive electrical connection by using a thin layer 46b of electrically conductive adhesive, such as epoxy.

Driver element 50 may be one of several types of transduction materials (e.g., ferroelectric, relaxor ferroelectric, magnetostrictive) having the property that when an electrical signal is applied, the length of driver element 50 will expand or contract. Accordingly, alternating electrical driving signals cause driver element 50 to mechanically vibrate. These vibrations are transmitted to diaphragm 22 in end plate 20. The vibrating diaphragm 22 projects acoustic signals 14 through surrounding water 12. Typically, driver element 50 may measure about 2×2×10 mm to effectively radiate acoustic signals through water medium 12 in the range of about 10 to 100 kiloHertz.

In accordance with this invention, driver element 50 is mechanically biased with a residual compressive stress created between compression screw member 40 and diaphragm 22. This prevents the transduction material from developing excessive tensile stress when it expands in length, and tightening screw member 40 creates this compressive stress to protect driver element 50.

Driver element 50 has its other end 50b bonded to hemisphere 60 with a conductive adhesive. Hemisphere 60 is fabricated from electrically conductive material, such as metal, and the uppermost portion, or apex 62 of hemisphere 60 is held against center portion 22a of diaphragm 22 along central axis 22c by the compressive force exerted by screw member 40. Since front plate 20 is made from an electrically conductive material and connector 16 is connected to front plate 20, an electrically conductive path is created through connector 16, front plate 20, diaphragm 22, and hemisphere 60 to driver element 50. Thus, diaphragm 22 is responsively displaced by electrical signals causing mechanical vibrations of driver element 50.

Figure 4:
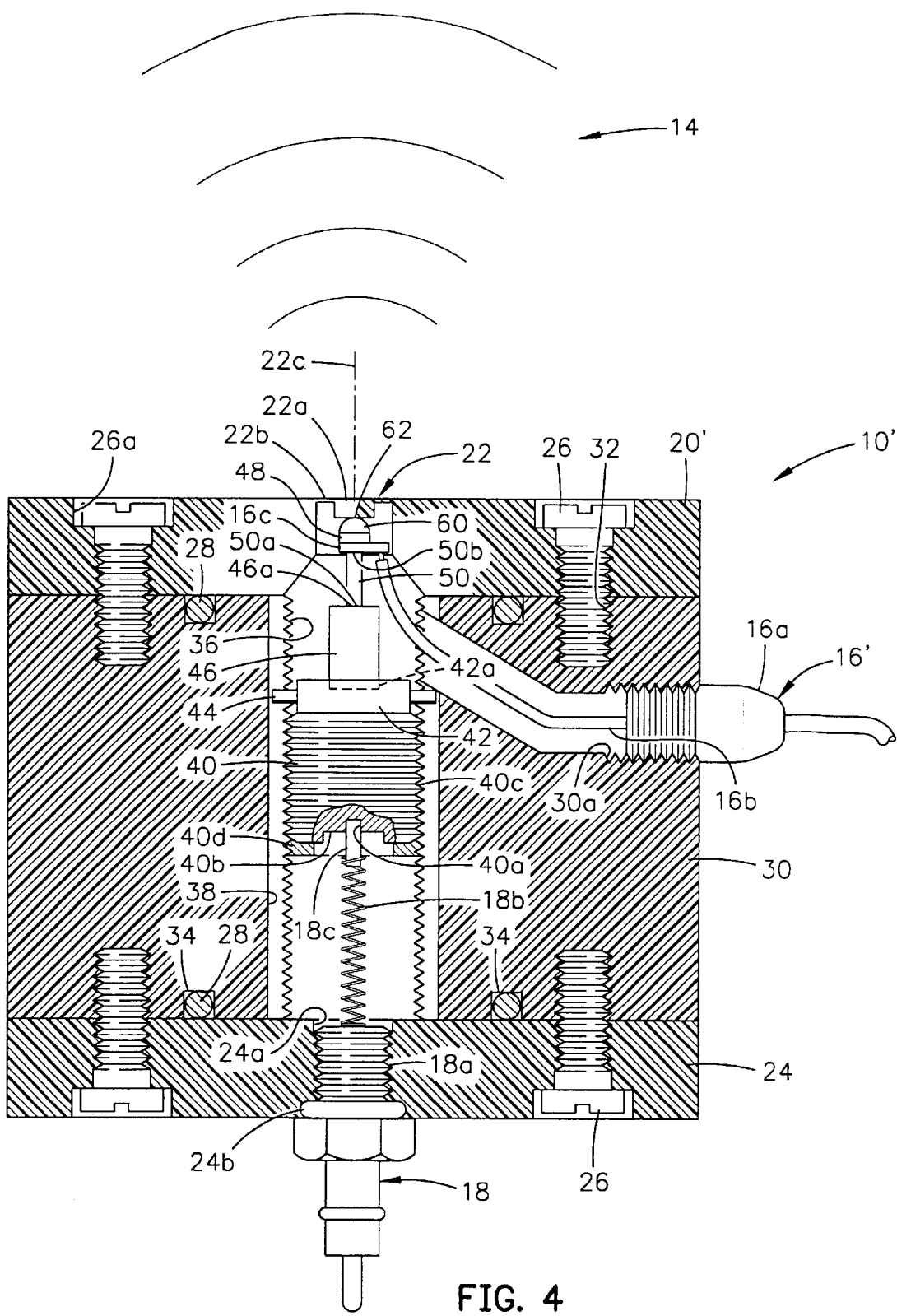
FIG. 4 is a cross-sectional view of a second embodiment.

Referring to the cross-sectional view of another embodiment in FIG. 4, this embodiment of the invention has some components that are essentially the same as the first embodiment. Transducer 10' is driven to project acoustic energy 14 when electrical driving signals from a remote source are coupled to it via electrical connectors 16' and 18.

Electrical connector 18 is essentially the same as described above, but electrical connector 16' has fitting 16a in outward extending threaded bore 30a in housing 30 and may be resiliently engaged and/or brazed to flexible lead 16b. The other end of lead 16b is connected and/or resiliently engaged to electrode tab 16c. Electrode tab 16c contacts or is adhered to end 50b of driver element 50 with a suitable conductive bonding agent, and electrical insulator layer 48 is interposed between electrode tab 16c and hemisphere 60 and adhered to them with a suitable bonding agent. This forms an electrically conductive path through connector fitting 16a, lead 16b, and electrode tab 16c to deliver electrical driving signals to driver element 50 from connector 16'. Insulator layer 48 electrically separates electrode tab 16c from hemisphere 60. The uppermost portion, or apex 62 of hemisphere 60 is held against center portion 22a of diaphragm 22 at central axis 22c by the compressive force exerted by screw member 40. Thus, diaphragm 22 may be responsively displaced by mechanical vibrations from driver element 50, and acoustic signals are projected.

Transducer 10' has front plate 20' and back plate 24 mounted on opposite ends of housing 30. Front plate 20' and back plate 24 may be made from electrically nonconducting, or insulator material such as the material commercially marketed under the trademark PLEXIGLAS, and what ever material is selected for front plate 201, it has a portion of it machined away to form diaphragm 22, which therefore is integral with it. It may be preferable to make front plate 20' from metal so that when material is machined away from it, the integral diaphragm 22 is more likely to have sufficient strength and suitable radiation properties. Diaphragm 22 may have dimensions and shape as referred to above, although many other shapes and thicknesses could be provided in accordance with different driver elements, driving signals, and materials available to responsively radiate acoustic energy 14.

This invention eliminates the need for one or more stress rods by using the innovative combination of coaxially aligned diaphragm 22, holder 42, mounting plug 46, compression screw member 40, and electrical connectors 16, 16', and 18 having leads 18b and 16b. By turning screw member 40 in the threaded bore 36, the appropriate mechanical compressive bias is created and maintained on driver element 50 by clamping driver element 50 between the combination of screw member 40-holder 42-plug 46 and diaphragm 22. There is no transmission of torsional stresses to driver element 50 as screw member 40 is rotated since driver element 50 is mounted on holder 42 via mounting plug 46. Two dowel pins 44, positioned 180 degrees apart along the circumference of holder 42, are free to longitudinally travel in two channels 38 in housing 30. As pins 44 move along channels 38, holder 42, plug 46, and driver element 50 are prevented from rotating, and retainer ring 40d may be included to prevent screw member 40 from loosening once desired compressive stress has been exerted on driver element 50.

Use of coil spring contacts 18b eliminates conventional hookup wires that might otherwise be coupled to screw member 40 and electrical connector 18. Unlike conventional hookup wires, coil spring contacts 18b do not have to be soldered to screw member 40 to therefore make the transducer assembly less complicated. The free end of each coil spring contact 18b resiliently fits over and electrically engages tapered pin 18c that is partially inserted, or wedged in indent 40a in screw member 40.

Driving electrical signals for driver element 50 are coupled through connector 18 and through an electrically conductive path that includes coil spring 18b, screw member 40, holder 42, and mounting plug 46. Since housing 30 is in physical contact with screw member 40, pins 44, holder 42, and mounting plug 46, the housing material, therefore, must be suitable electrical insulator that is strong enough to bear exertion of compressive force on screw member 40. The commercially available product marketed under trademark PLEXIGLAS is satisfactory.

Front plate 20, 20' and diaphragm 22 may be constructed from a variety of materials and diaphragm 22 can have various cross-sectional shapes. Hemisphere 60 is adhesively bonded directly or through insulator layer 48 and electrode tab 16c to driver element 50. Hemisphere 60 thusly uniformly distributes compressive stress generated by tightening screw member 40 over the cross-sectional area of driver element 50.

Front plate 20, 20' is detachable to permit removal and replacement of front plate 20, 20' and diaphragm 22. Rear plate 24 is detachable for maintenance and removal and replacement of components. In addition, electrical connector 18 may be removed from threaded hole 24a to allow access to compression screw member 40 to adjust the mechanical bias or to remove driver element 50.

Electroacoustic transducer 10, 10' as disclosed herein eliminates the need for one or more compressive stress rods. This is a particularly advantageous feature when working with small sizes of ferroelectric drivers such as required herein. The novel and uncomplicated design of electroacoustic transducer 10, 10' as disclosed herein reduces the number of constituent parts and reduces the effort to disassemble and reassemble when replacing drive element 50, for example. Housing 30 has compactly packaged components, as described in detail herein, coaxially aligned with threaded axial bore 36. These components include compression screw member 40, holder 42, mounting plug 46, insulator layer 48, driver element 50, and hemisphere 60. Second connector 18 in threaded hole 24a in back plate 24 and diaphragm 22 in front plate 20, 20' also are coaxially aligned with threaded bore 36, and diaphragm 22 has portions 22a and 22b that radially extend outwardly from the axis of threaded bore 36.

Electroacoustic transducer 10, 10' of this inventive concept applies compressive mechanical bias to ferroelectric driver element 50 by the combined actions of flexing diaphragm 22 and compression screw member 40. Compression screw member 40 serves as one part of the conductive path to electrical connector 18, and electrical connection between screw member 40 and underwater electrical connector 18 includes resilient coil spring 18b. Electroacoustic transducer 10, 10' has apex 62 of hemisphere 60 to establish a single central controlled point of contact along central axis 22c of diaphragm 22. This minimizes the chance of fracturing driver element 50 that might otherwise be caused by uneven stress on the end of driver element 50 if it were in direct contact with diaphragm 22.

Having the teachings of this invention in mind, modifications and alternate embodiments of this invention may be fabricated to have a wide variety of applications in other systems. For examples, in accordance with this invention, electoacoustic transducer 10, 10' could have larger or smaller driver elements 50 and diaphragms 22 to project different acoustic signals, and different housings 30 and plates 20, 20' and 24 with different sealing arrangements could be fabricated to function in higher ambient pressures without departing from the scope of this invention.

The disclosed components and their arrangements as disclosed herein all contribute to the novel features of this invention. Electroacoustic transducer 10, 10' of this invention provides a reliable and cost-effective means to generate and project acoustic signals through the water. Therefore, electroacoustic transducer 10, 10' as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An electroacoustic transducer comprising:
    a housing made from insulator material having a threaded bore and at least one longitudinally extending channel adjacent said threaded bore;
    an electrically conductive screw member in said threaded bore, said screw member having an outer threaded surface to mate with said threaded bore;
    an electrically conductive holder in said threaded bore, said holder being sized to be axially displaced therein and having at least one pin to extend in said at least one channel to prevent rotation thereof, said holder being electrically coupled to said screw member;
    a transducer driver element having first and second ends aligned with said threaded bore, said first end being electrically coupled to said holder;
    a hemisphere aligned with said threaded bore being mounted on said second end of said driver element; and
    a diaphragm centered on said hemisphere and radially extending therefrom.

2. An electroacoustic transducer according to claim 1 further comprising:
    a first electrical connectors, electrically coupled to said second end of said driver element;
    a fitting coaxially aligned with said threaded bore; and
    a coil spring coupled to said fitting and said screw member, said fitting and coil spring comprising a second connector together with said first connector to connect electrical signals to said driver element.

3. An electroacoustic transducer according to claim 2 further comprising an electrically conductive mounting plug in said threaded bore between said holder and said driver element, said mounting plug being sized to be axially displaced therein and being bonded to said first end of said driver element with an electrically conducting adhesive.

4. An electroacoustic transducer according to claim 3 wherein said screw member, said holder, said mounting plug, said driver element, said hemisphere, and said diaphragm are coaxially aligned with said threaded bore.

5. An electroacoustic transducer according to claim 3 wherein said electrical signals are coupled through said coil spring of said second connector and through a first electrically conductive path including said screw member, said holder, and said mounting plug to said driver element.

6. An electroacoustic transducer according to claim 2 further comprising:
    a front plate extending across one end of said threaded bore and being connected to said housing, said front plate having a portion machined away to form said diaphragm as an integral part; and
    a back plate extending across another end of said threaded bore and being connected to said housing, said back plate having a threaded hole axially aligned with said threaded bore to receive said fitting of said second electrical connector therein.

7. An electroacoustic transducer according to claim 6 wherein said fitting of said second electrical connector is removable from said threaded hole to allow insertion of a tool through said threaded hole to engage said screw member and permit rotation of said screw member to displace said screw member, said holder, and said mounting plug toward said diaphragm and thereby exert compressional bias on said driver element between said mounting plug and said diaphragm.

8. An electroacoustic transducer according to claim 5 further comprising:
    a front plate extending across one end of said threaded bore and being connected to said housing, said front plate having a portion machined away to form said diaphragm as an integral part; and
    a back plate extending across another end of said threaded bore and being connected to said housing, said back plate having a threaded hole axially aligned with said threaded bore to receive said fitting of said second electrical connector therein.

9. An electroacoustic transducer according to claim 8 further comprising:
    a pair of O-rings, one of said O-rings being between said front plate and said housing and the other of said O-rings being between said rear plate and said housing; and
    a plurality of bolts extending through holes in said front plate and said rear plate for engaging threaded bores in said housing to seal said threaded bore from surrounding water.

10. An electroacoustic transducer according to claim 9 wherein said fitting of said second electrical connector is removable from said threaded hole to allow insertion of a tool through said threaded hole to engage said screw member and permit rotation of said screw member to displace said screw member, said holder, and said mounting plug toward said diaphragm and thereby exert compressional bias on said driver element between said mounting plug and said diaphragm.

11. An electroacoustic transducer according to claim 8 wherein:
    said hemisphere is electrically conductive and is bonded to said second end of said driver element;
    said front plate is electrically conductive material; and
    said first connector is connected to said front plate.

12. An electroacoustic transducer according to claim 11 wherein connection of said first connector to said front plate creates an electrically conductive path through said first connector, said front plate, said diaphragm, and said hemisphere to said driver element.

13. An electroacoustic transducer according to claim 10 further comprising:
    an insulator layer between said driver element and said hemisphere;
    an electrode tab between said insulator layer and said driver element, said electrode tab being bonded to said driver element with an electrically conducting adhesive; and
    an electrical lead coupled to said electrode tab and said first connector.

14. An electroacoustic transducer according to claim 2 further comprising:
    an insulator layer between said driver element and said hemisphere;

an electrode tab between said insulator layer and said driver element, said electrode tab being bonded to said driver element with an electrically conducting adhesive; and an electrical lead coupled to said electrode tab and said first connector.

15. An electroacoustic transducer according to claim 13 wherein a second fitting of said first connector extends through a threaded hole in said housing to couple driving signals to an electrically conductive path including said second fitting, said electrical lead, said electrode tab, and said driving element.

16. An electroacoustic transducer comprising:

a housing made from insulator material having a threaded bore and at least one longitudinally extending channel adjacent said threaded bore;

an electrically conductive screw member in said threaded bore, said screw member having an outer threaded surface to mate with said threaded bore;

an electrically conductive holder in said threaded bore, said holder being sized to be axially displaced therein and having at least one pin to extend in said at least one channel to prevent rotation thereof, said holder being electrically coupled to said screw member;

a transducer driver element having first and second ends aligned with said threaded bore, said first end being electrically coupled to said holder;

a hemisphere aligned with said threaded bore being mounted on said second end of said driver element;

a diaphragm centered on said hemisphere and radially extending therefrom;

a first fitting in a bore outwardly extending from said threaded bore;

a flexible lead electrically coupled to said first fitting;

an electrode tab connected to said lead and said second end of said driver element, said first fitting, flexible lead and electrode tab comprising a first electrical connector;

a second fitting coaxially aligned with said threaded bore; and a coil spring coupled to said second fitting and said screw member, said second fitting and coil spring forming a second electrical connector together with said first connector to connect electrical signals to said driver element.

* * * * *